United States Patent

May et al.

[11] Patent Number: 5,862,717
[45] Date of Patent: Jan. 26, 1999

[54] MOTORCYCLE TRANSMISSION WITH TORQUE CONVERTER

[76] Inventors: Albert L. May, Rt. #2, Box 129, Vinita, Okla. 74301; Scot J. Hough, P.O. Box 761, Ketchum, Okla. 74349

[21] Appl. No.: 778,502

[22] Filed: Jan. 3, 1997

Related U.S. Application Data

[60] Provisional application No. 60/009,654 Jan. 4, 1996.

[51] Int. Cl.⁶ ............................. F16H 47/00; F16D 33/00
[52] U.S. Cl. ..................... 74/730.1; 192/3.25; 192/85 A
[58] Field of Search ................. 74/730.1, 731.1, 74/474; 192/3.25, 3.32, 85 A; 180/230, 227; 73/134

[56] References Cited

U.S. PATENT DOCUMENTS

| | | | |
|---|---|---|---|
| 2,719,440 | 10/1955 | Banker | 74/731.1 |
| 2,943,515 | 7/1960 | Isaacson et al. | 74/730.1 |
| 3,163,271 | 12/1964 | Hilpert | 192/3.25 |
| 4,196,617 | 4/1980 | Leone | 73/134 |
| 4,673,071 | 6/1987 | Moroto et al. | 192/3.25 X |
| 4,765,200 | 8/1988 | Koskimo | 192/3.25 X |
| 4,768,633 | 9/1988 | Kubo et al. | 192/3.29 |
| 5,253,548 | 10/1993 | Sahashi | 74/730.1 X |
| 5,584,214 | 12/1996 | Hayashi et al. | 74/730.1 X |

*Primary Examiner*—Charles A Marmor
*Assistant Examiner*—Marcus Charles
*Attorney, Agent, or Firm*—Gregory J. Nelson

[57] ABSTRACT

A transmission for a motorcycle utilizing an automotive engine. The transmission has a torque converter that serves as a fluid coupling to the engine and multiplies torque at low speeds. A valve is manually operable as by a foot pedal to lock-up a pressure plate in the converter when a predetermined speed is reached so a direct mechanical connection is established between the engine output and the transmission power output via an axially extending main shaft. The transmission power output includes a bevel gear arrangement which drives an output shaft which is 90° with respect to the axis of the transmission.

5 Claims, 6 Drawing Sheets

MOTORCYCLE TRANSMISSION WITH TORQUE CONVERTER

REFERENCE TO PRIOR APPLICATION

This is a complete application based on Provisional Patent Application Ser. No. 60/009,654, filed Jan. 4, 1996, titled "Torque Converter Clutch Pack and 90° Power Transfer".

BACKGROUND OF THE INVENTION

Field of the Invention

The present invention relates to a transmission and more particularly relates to a transmission, particularly for a motorcycle, which has a torque converter which operates to couple the engine to the output shaft at low speeds and which at higher speeds establishes a direct mechanical connection between the engine and the output shaft.

Some motorcycles utilize automotive engines such as Chevrolet V-6 or V-8 engines. Currently there are approximately ten manufacturers of automotive engine power motorcycles on the market. Representative of these is the Kannon V-cycle which is manufactured using both V-6 and V-8 engines. Motorcycles with engines of this type share a common problem. In order to travel at speeds of less than thirteen miles per hour, the motorcycle rider must slip a hand-held clutch. Since there is no neutral lock-out, the motorcycle remains in gear at all times. This results in serious disadvantages as the rider does not have full control of the motorcycle when the clutch is in the slipped position. Further problems can arise if the rider accidently releases the clutch suddenly engaging the transmission causing the motorcycle to lurch causing a loss of control. Another problem attendant to conventional transmissions used with large block motorcycles is that slipping the clutch results in unnecessary and premature wear of the clutch mechanism.

In view of the foregoing, there is a demonstrated need for an improved mechanism for shifting motorcycles of the type utilizing automotive engines which is safer, effective and convenient to use.

There are a number of motorcycle transmissions commercially available and the patent literature discloses a number of drive mechanisms which are represented by the following:

U.S. Pat. No. 2,943,515 discloses a power transmitting apparatus, particularly one employing a hydro-kinetic type of torque transmitting unit in combination with a chain speed gear box transmission unit with a plurality of selectively operable clutch means.

U.S. Pat. No. 4,079,820 discloses a rotary power transmission having a hydrodynamic speed or torque converter or other fluid coupling in combination with a magnetically actuated friction clutch. The friction clutch is accommodated inside the housing of the fluid coupling and the magnet which actuates the friction clutch located outside the housing and the magnetic field generated is effective through the housing.

U.S. Pat. No. 4,673,071 discloses a power delivery system which includes an input shaft and an output shaft disposed concentrically with the input shaft, a fluid coupling and a power cut-off device interposed between the input and output shafts. The case containing the fluid coupling is located on a radial inner side of the fluid coupling and an oil pump for supply of oil into the fluid coupling case is positioned within the case adjacent the radially inward periphery of the power cut-off device.

U.S. Pat. No. 4,733,761 discloses a power delivery system including an input shaft for transmitting driving power of an engine, an output shaft mounted concentrically with the input shaft, a pump mounted concentrically between the input and output shaft and connected to the input shaft, a fluid coupling having a turbine connected to the output shaft, the case containing the fluid coupling and a power cut-off device. The power cut-off device is provided with a frictional coupling element and a servo mechanism.

U.S. Pat. No. 4,667,762 discloses a drive mechanism for a motorcycle having a rear wheel which is supported by a trailing arm and is driven by a drive that includes an intermediate shaft that is rotatably journaled on the trailing arm. One end of the intermediate shaft is driven from the engine output shaft by a drive shaft and the other end of the intermediate shaft drives the rear wheel through a chain. The chain is positioned a substantially greater distance outwardly of the longitudinal center line of the motorcycle than is the drive shaft so as to afford good driver position and a relatively narrow width.

U.S. Pat. No. 5,263,549 also discloses a motorcycle shaft drive mechanism and a drive gear located on a drive shaft for rotation and axle gear located on the rear axle for driving the rear axle. A pinion shaft is provided having a front pinion gear matching the drive gear and a rear pinion gear matching the rear axle so that when the drive shaft is driven, the force supplied by the drive gear to the front pinion gear creates a moment on the pinion shaft about the drive shaft which is opposite to and balances the moment on the pinion shaft about the rear axle.

BRIEF SUMMARY OF THE INVENTION

Briefly, the present invention relates to a multi-speed transmission for motorcycles of the type utilizing large automotive engines such as a V-6 or V-8 engine. The transmission includes a torque converter, fluid pump, clutch pack and a 90° power transfer system. The input of the unit is connected to the output shaft of the motorcycle engine. The torque converter multiplies the engine's torque and acts as a fluid coupling from the engine to the transmission eliminating the hand-held clutch. The torque converter will accommodate slippage at low speeds such as speeds below thirteen miles per hour.

The torque converter pump pumps fluid through the stator and against a turbine. The fluid is directed through the torque converter where it multiplies the power of the engine and transmits additional power to the output shaft. A gear pump is shaft driven and is in communication with a directional control valve.

When the rider manually operates the control valve to a first position as by a foot pedal, a valve spool is positioned so that fluid that is directed to the clutch pack and a pair of engaging bevel gears and the output shaft which is at 90° with respect to the main shaft. The 90° output shaft is connected to the rear motorcycle wheel by a suitable power transmission system such as a chain drive. Once highway speed is obtained, the control valve is manually positioned to direct fluid to a lock-up or pressure plate located inside the torque converter, thereby creating a direct drive from the engine to the output shaft. The clutch pack may be disengaged to provide a neutral position.

BRIEF DESCRIPTION OF THE DRAWINGS

The above and other objects and advantages of the present invention will be more fully appreciated and understood from the following description, claims and drawings in which:

Referring to FIG. 1 illustrates a motorcycle generally designated by the numeral 10 and which has a conventional frame 12 which supports a automotive engine 14. Power is transferred from the engine 14 which has an output shaft coupled to the transmission 15 of the present invention. The output of the transmission 15 has a shaft 16 which is parallel to the rear axle 21 of the motorcycle. A large sprocket 20 is attached to the rear axle 21 and a small sprocket 22 is connected to the output shaft 16 of the transmission. The sprockets are interconnected by a suitable power transmission means such as a drive chain 24. The particular ratio between the sprockets 20, 22 may be selected by the user or the manufacturer in accordance with the requirements of the user.

As pointed out above, a problem with motorcycles of this type is low speed operation as conventionally the rider must slip a hand-held clutch to lock out or to disengage the engine from the transmission.

According to the present invention, a foot pedal 30 may be operated to selectively position the spool of a hydraulic control valve in the transmission 15 so that at low speeds a clutch within the transmission is actuated and operates to establish a fluid coupling between the engine output and the output shaft 16 of the transmission. Once predetermined speed is obtained, as for example thirteen miles per hour, the rider will operate the foot pedal 30 to direct fluid from the clutch to the lock-up or pressure plate creating a direct drive from the engine to the power output. A significant advantage of the present invention is that the power output shaft is a 90° shaft that is positioned parallel to the rear wheel axle so that a direct drive such as a chain drive can be utilized.

Figure 2:
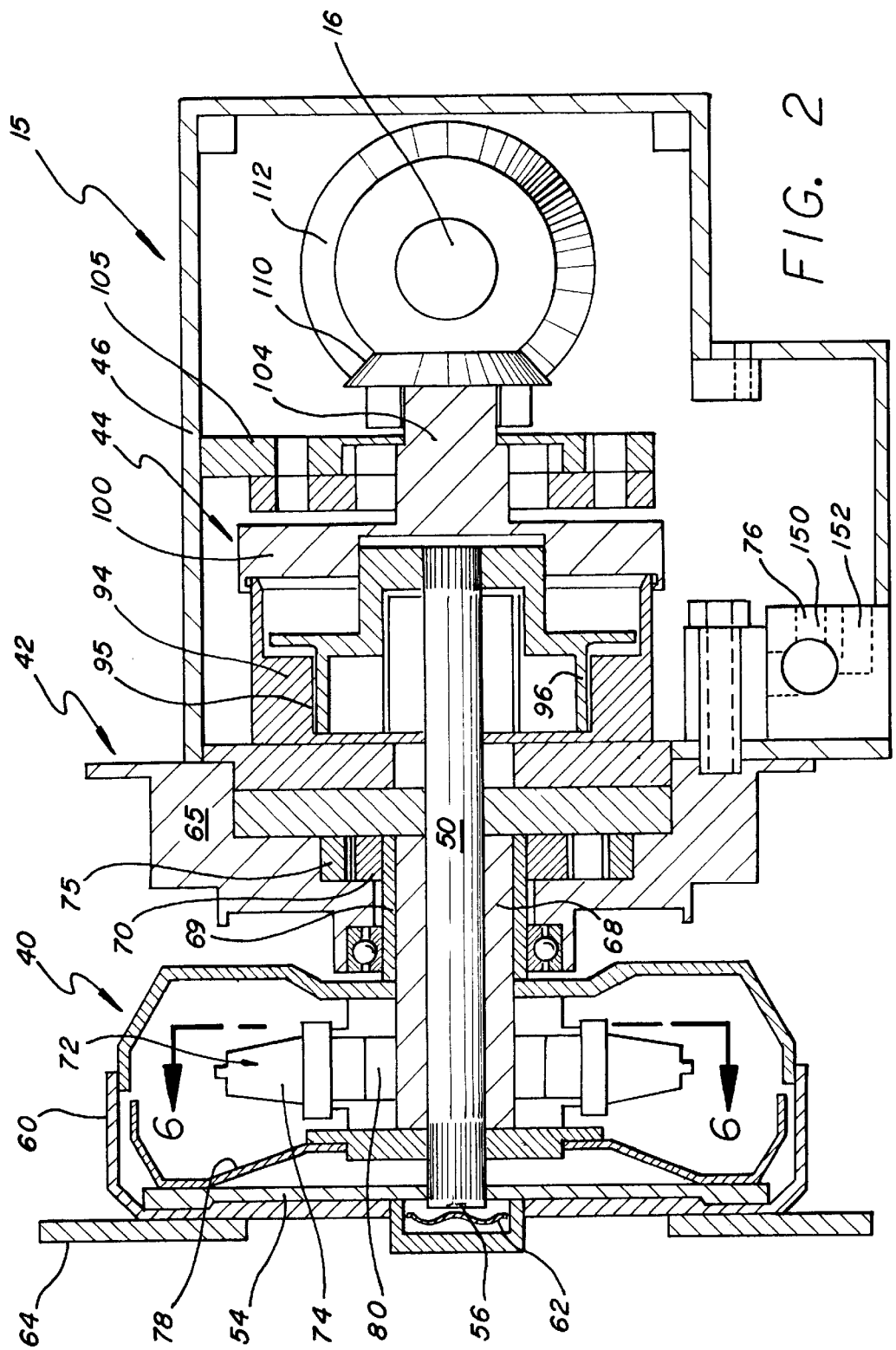
FIG. 2 is an axial cross-sectional view of the transmission according to the present invention.
Figure 3:
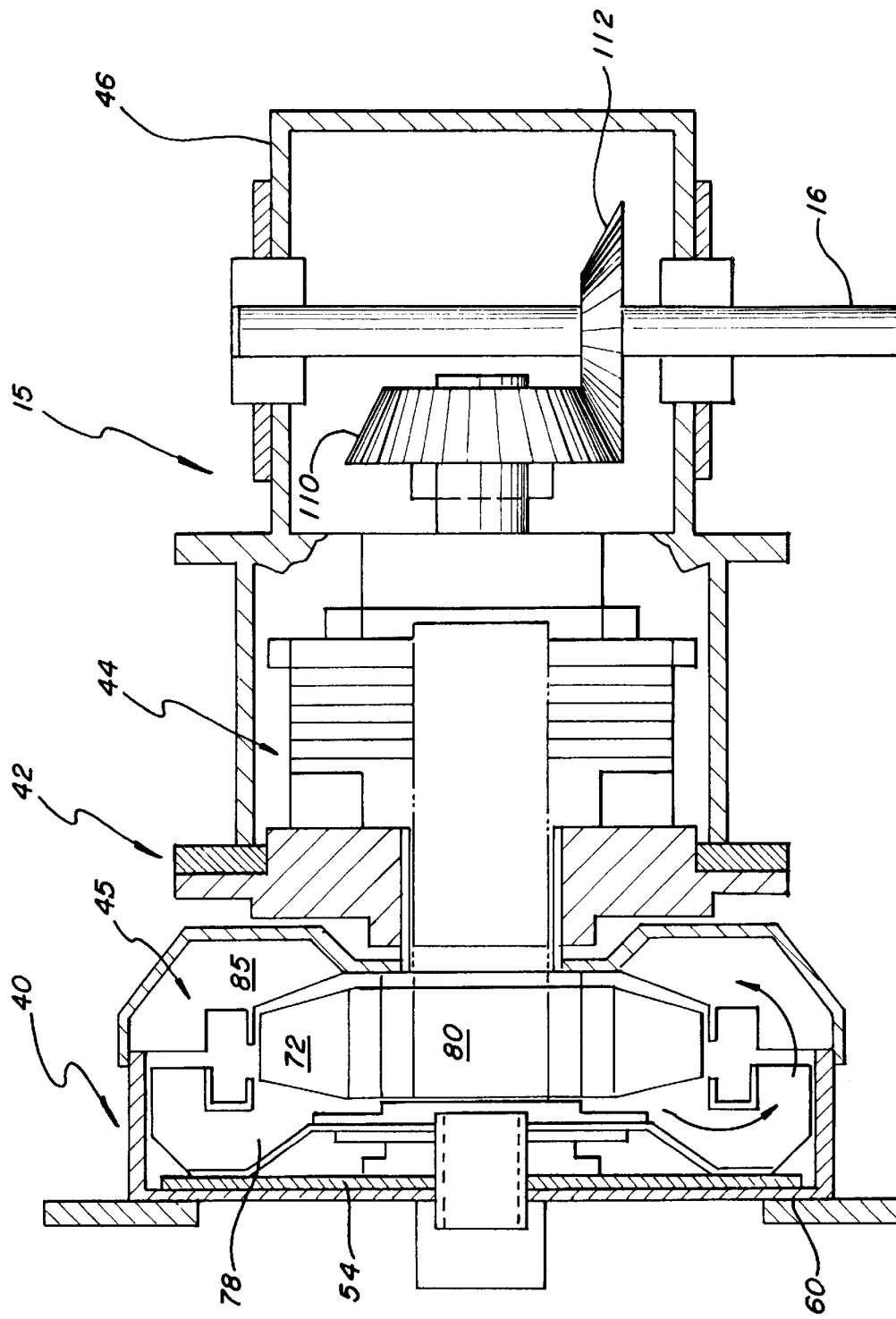
FIG. 3 is an axial view of the transmission according to the present invention with the housing broken away.

Turning now to the drawings, FIGS. 2 and 3 illustrate the transmission 15. The transmission has a converter section 40, converter pump section 45, gear pump 42 and a clutch section 44. The clutch section is located within bell housing 46. A main drive shaft 50 extends axially through the unit and a pressure plate 54 is splined to the end of the shaft 50 and is axially moveable by selectively directing hydraulic fluid pressure from nozzle 56 on shaft 50 against the plate to bring the pressure plate into engagement with the interior of the converter cover 60. A wave washer 62 applies a rightward biasing force against the pressure plate 54 to normally disengage the pressure plate from the cover. The cover 60 has flanges 64 which are attachable to the fly wheel at the output of the motorcycle engine by bolts or similar fasteners.

Figure 5:
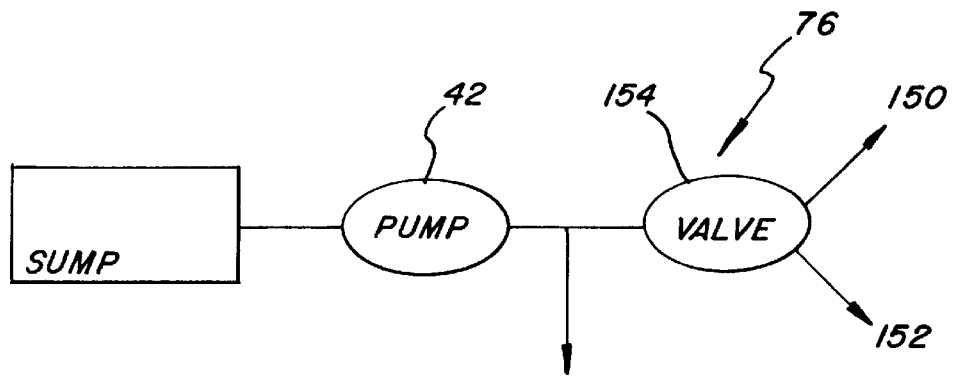
FIG. 5 is a schematic diagram of the hydraulic system of the transmission of the present invention.

The transmission includes a pump section 42 having a gear pump housing 65. A hub 69 is concentric with respect to the main drive shaft 50 and is attached to the converter section cover 60. An inner eccentric gear 70 is driven by the hub 69 within outer concentric gear 75. This type of pump works well at high speeds to provide hydraulic fluid pressure. The pump provides pressurized fluid to the control valve 76 as seen in FIG. 5.

Figure 6:
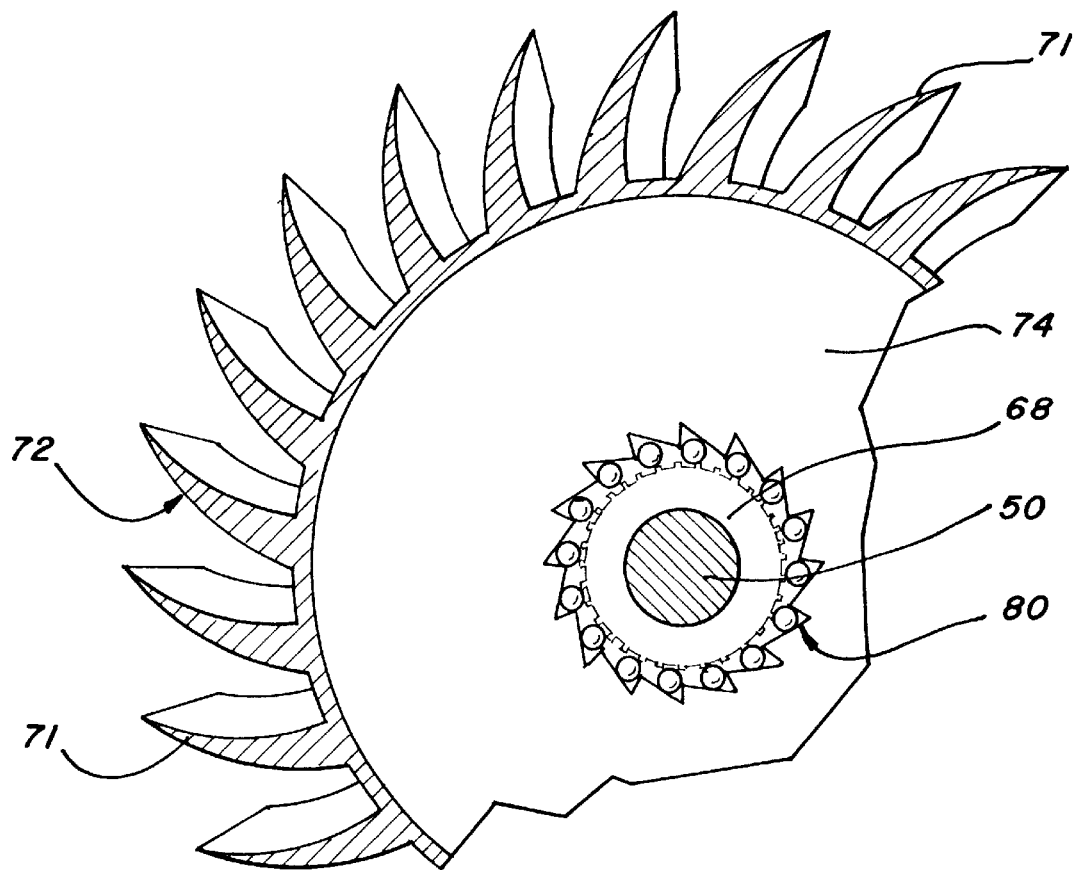
FIG. 6 is a cross-sectional view of the stator taken along line 6—6 of FIG. 2.
Figure 7:
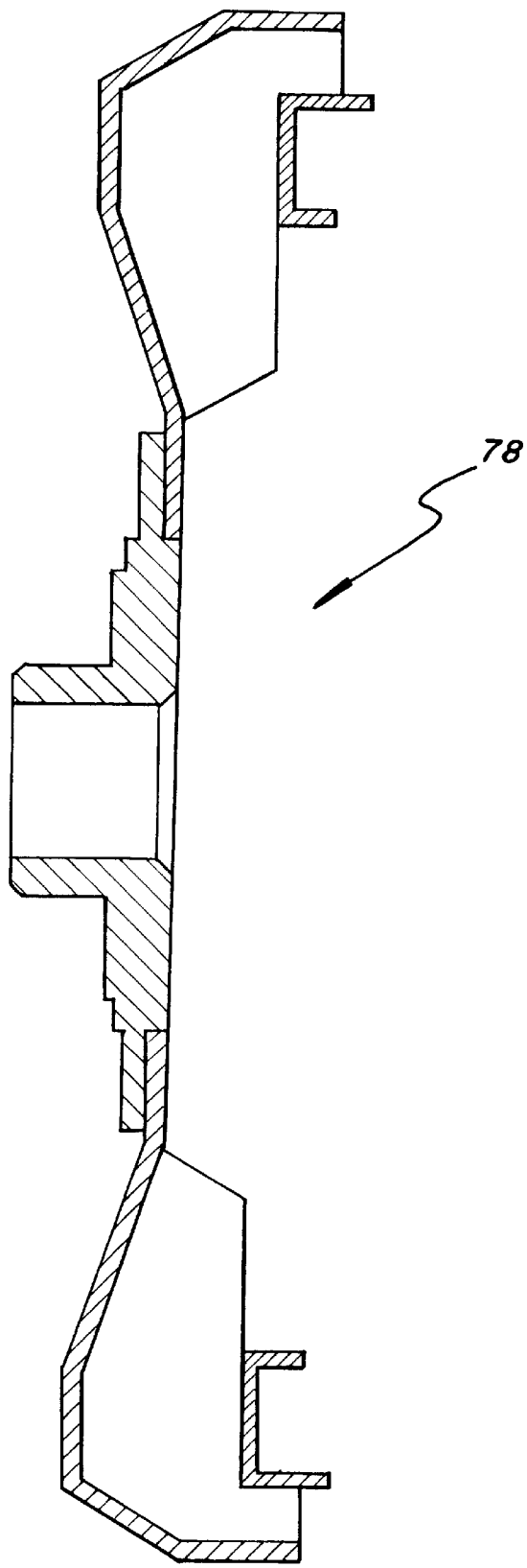
FIG. 7 is a detail view of the turbine.

As seen in FIG. 3, the converter section includes a stator 72, a turbine 78 and a converter pump 45 having impellers 85. FIG. 7 also shows the turbine 78. The converter pump is located on and is part of the cover 60. The stator 72 is secured to the stator shaft 68 at sprag unit 80. Fluid in the cover is picked up by suction induced by rotation of the cover and is directed by the pump impellers 85 against the stator 72 and is then directed to the turbine. Fluid is provided to the cover interior from the pump 42 as schematically shown in FIG. 5. The stator vanes 71 are curved and are angularly disposed about the shaft 68 as seen in FIG. 6. The turbine 78 is connected to the axially extending main shaft 50 between the pressure plate and the stator as seen in FIG. 2. Reference is made to an article titled "Torque Selection", *Car Craft,* June, 1993, for a discussion of torque converter designs.

Located within the housing 46 is clutch 44. Clutch 44 includes outer member 94 and inner member 96. Member 96 is fixed to the shaft 50. A plurality of vanes 95 which, when actuated by fluid pressure, will engage the outer clutch member 94, causing it to rotate with the shaft 50. Rotation of the clutch components will, in turn, impart rotation to the drive member 100. Drive member 100 has an axially extending hub 104 which is journaled for rotation in bearing support plate 105 which terminates at bevel gear 110 which gear is secured to the hub by conventional means such as a key way or spline. The power output includes bevel gear 110 in engagement with bevel gear 112 which is a secured to output shaft 16 which is perpendicular or 90° with respect to the main drive shaft 50 and parallel to the rear axle 21 of the motorcycle.

The control valve 76 is located in housing 46 and, as seen in FIG. 3, has a pair of output ports 150 and 152 which are connected to an input port 154 communicating with the output of the gear pump 42. The valve spool 158 has a reduced diameter section with a bore therein and, in a first spool position, fluid from the sump is directed through fluid passageways to the clutch member 96. Once a predetermined highway speed is obtained, the valve is manually operated by means of a foot pedal 30 or other operable means to direct fluid to the nozzle 56 in the converter section to move the pressure plate 54 to a lock-up position against the inner surface of the converter cover 60 to create a direct drive from the engine to the power output at shaft 16. If the control valve is moved to the third position shown in FIG. 4, fluid is directed to the sump and a neutral position is achieved.

Operation

Figure 1:
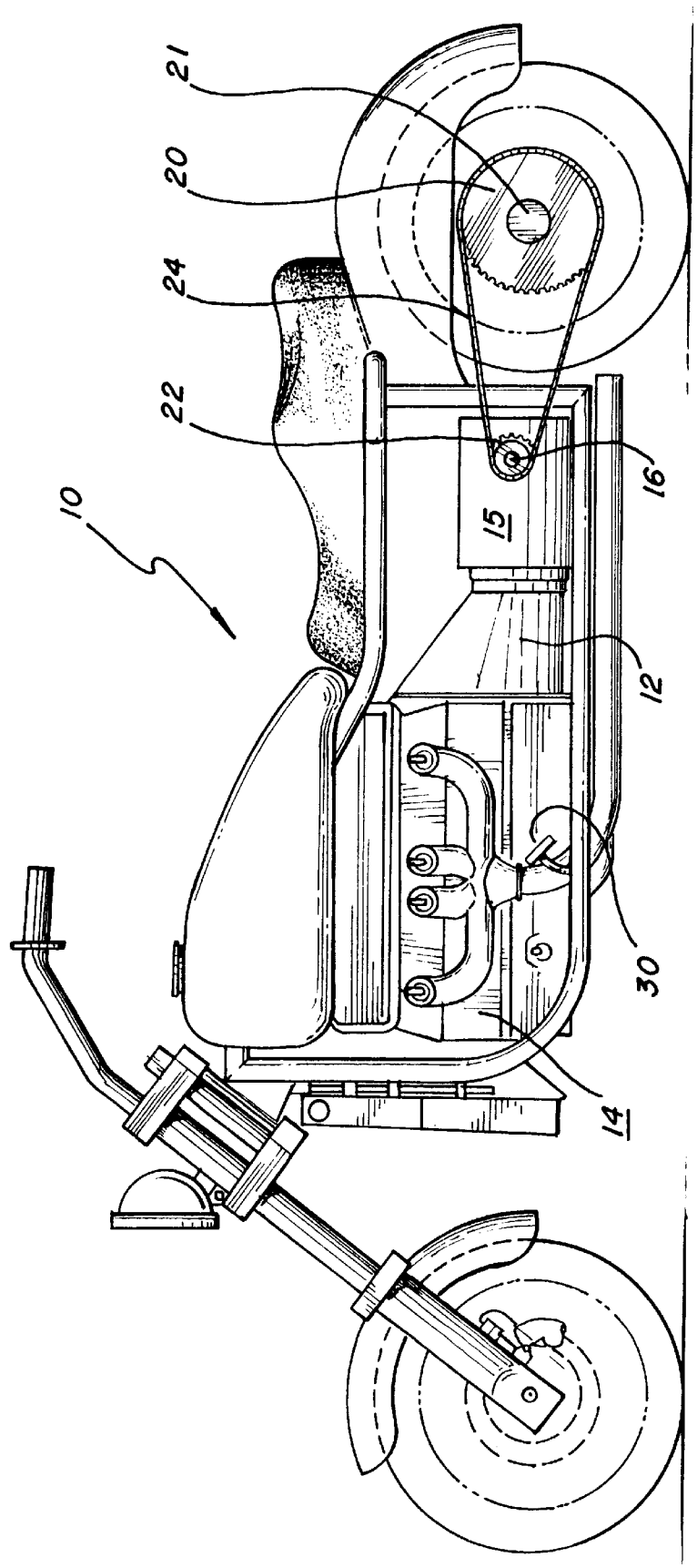
FIG. 1 is an elevational view of a motorcycle showing the power transmission of the present invention installed.

The transmission is installed in a motorcycle or other vehicle as shown in FIG. 1. Normally the idling output of the engine is about 600–800 rpm. Initially the rider will, by using the foot pedal 30, place the valve 76 in the first position which will cause engagement of the inner and outer clutch components 96, 94. The pressure plate 54 is disengaged from the cover 60 by virtue of the force applied by the wave spring 62. Fluid is picked up from the converter sump by means of the rotating converter pump 45 and directed to the stator and fluid within the converter cover 60 is directed against the turbine which, in turn, drives the stator. The stator 72 is connected to the hollow stator shaft 68 at the sprag 80. Fluid discharged from the stator returns to the sump to be picked up by the converter pump.

The converter provides a fluid coupling between the engine and the output shaft. Typically, some slip occurs and for a typical engine, slip of about 12% until lock-up is desirable.

At a predetermined speed, about 10–15 mph, the rider will cause the control valve to direct fluid to the nozzle 56 at the pressure plate overcoming the biasing force of the wave washer which establishes lock-up and a direct mechanical connection between the flywheel and the 90° output shaft by means of shaft 50.

Figure 4:
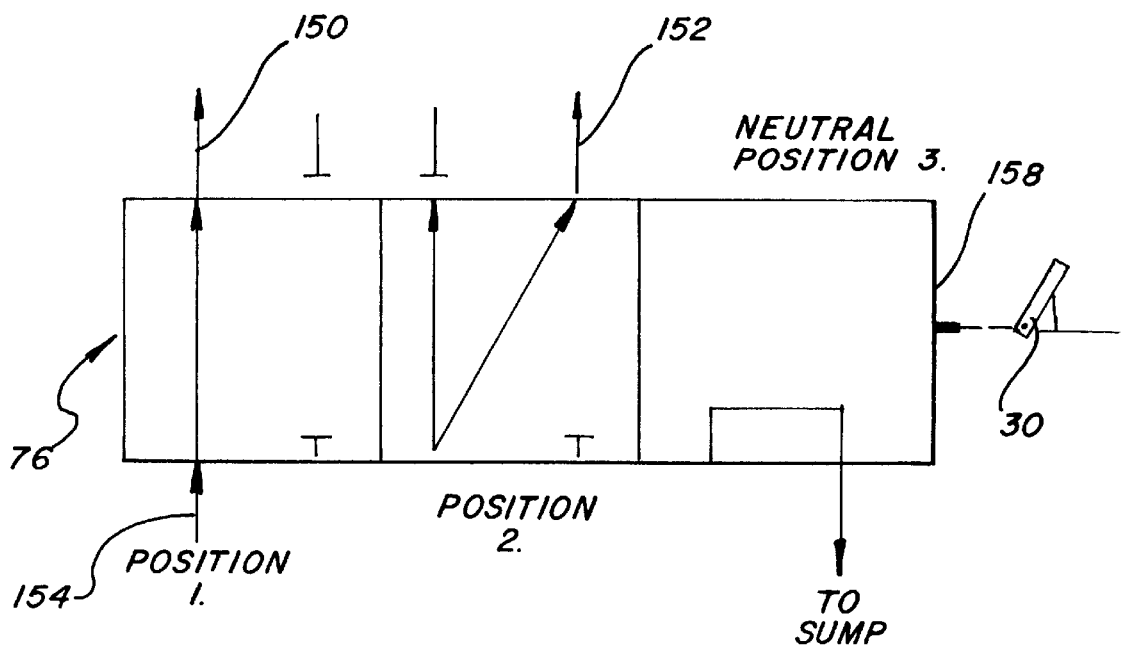
FIG. 4 is a schematic of the directional control valve.

If it is desired to place the transmission in neutral, the valve 76 is moved by use of pedal 30 to the third or neutral position shown in FIG. 4 which disengages the clutch 44.

For convenience and clarity of understanding, the various fluid passageways within the unit have not been shown but have been described or shown only schematically. As is well known, fluid may be conducted by means of internal and external hydraulic lines and/or use of fluid passageways provided in the components such as within or along shaft members.

While the principles of the invention have been made clear in the illustrative embodiments set forth above, it will be obvious to those skilled in the art to make various modifications to the structure, arrangement, proportion, elements, materials and components used in the practice of the invention. To the extent that these various modifications do not depart from the spirit and scope of the appended claims, they are intended to be encompassed therein.

We claim:

1. A transmission for a motorcycle of the type powered by an automotive engine connectable to the output of the engine comprising:
   (a) a torque converter section having a cover, said torque converter section being connectable to the output of the engine and having a turbine, stator and pump;
   (b) an axially extending drive shaft having a power output end and having an input end driven by said torque converter section;
   (c) an outer hub concentrically arranged with respect to said drive shaft, said hub being connected to said torque converter section and being driven thereby;
   (d) said turbine being on said drive shaft and receiving fluid from said pump and stator to establish a fluid coupling between said engine output and said drive shaft;
   (e) a clutch having a body and a hydraulically actuable inner member, said inner member carried on said drive shaft and being selectively actuable to drivingly engage said body;
   (f) power output shaft carried on said clutch body including a first bevel gear;
   (g) a second bevel gear having an output 90° to said power output shaft and engaging said first bevel gear;
   (h) a gear pump interposed between said torque converter section and said clutch and being driven by said hub;
   (i) a sump within a housing for receiving for receiving hydraulic fluid; and
   (j) a hydraulic valve in fluid connection with said pump and having a control member positionable to direct fluid to said sump or to said clutch with a neutral position being established when fluid is directed to said sump.

2. The transmission of claim 1 further including a pressure plate on said drive shaft and means for selectively engaging said pressure plate and cover and wherein said means for selectively engaging said plate and cover comprise said fluid control valve for selectively directing fluid pressure against said pressure plate.

3. The transmission of claim 1 wherein said pump means comprises impeller means on said cover and wherein the stator has vanes angularly disposed to direct fluid to said turbine thereby multiplying the delivered torque.

4. The transmission of claim 1 wherein said control member is manually positionable by a foot pedal.

5. The transmission of claim 1 further including a pressure plate on said drive shaft and means for selectively urging said pressure plate into engagement with said cover to establish a direct mechanical drive connection between said engine output and said drive shaft.

* * * * *